INVENTOR
IVAN J. GARSHELIS
BY
Hubbell Cohen Steibel
ATTORNEYS.

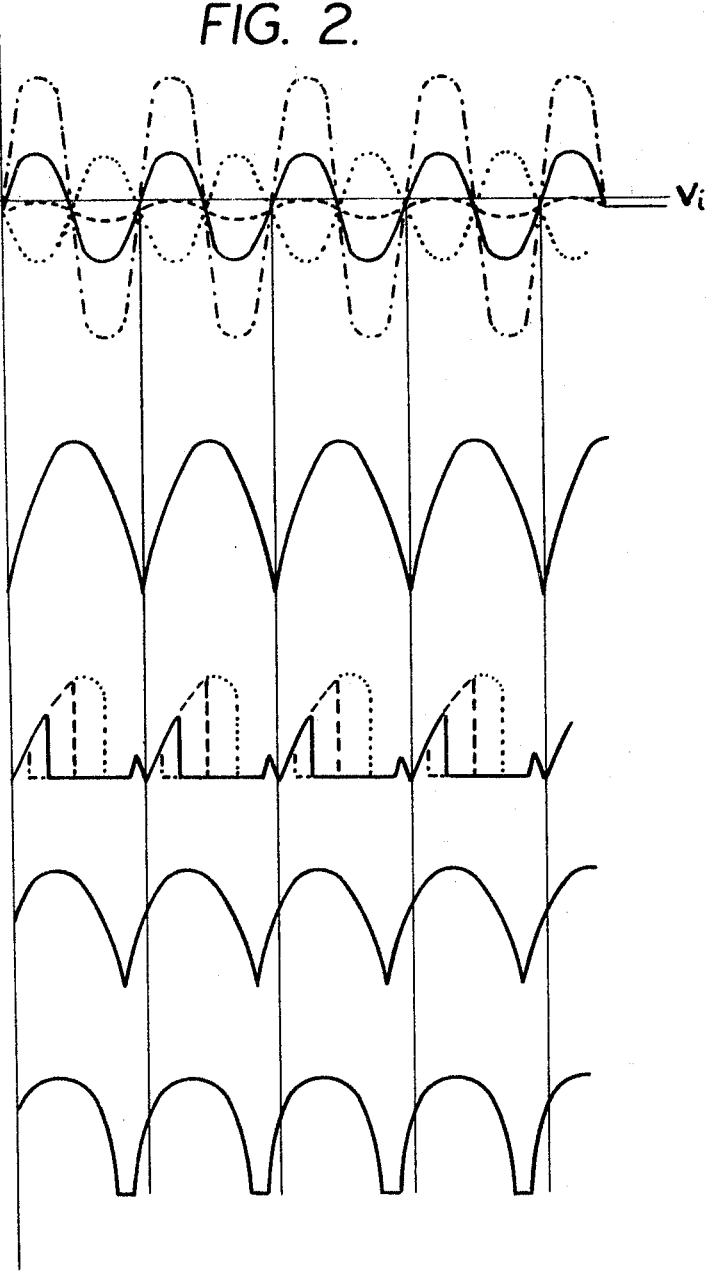

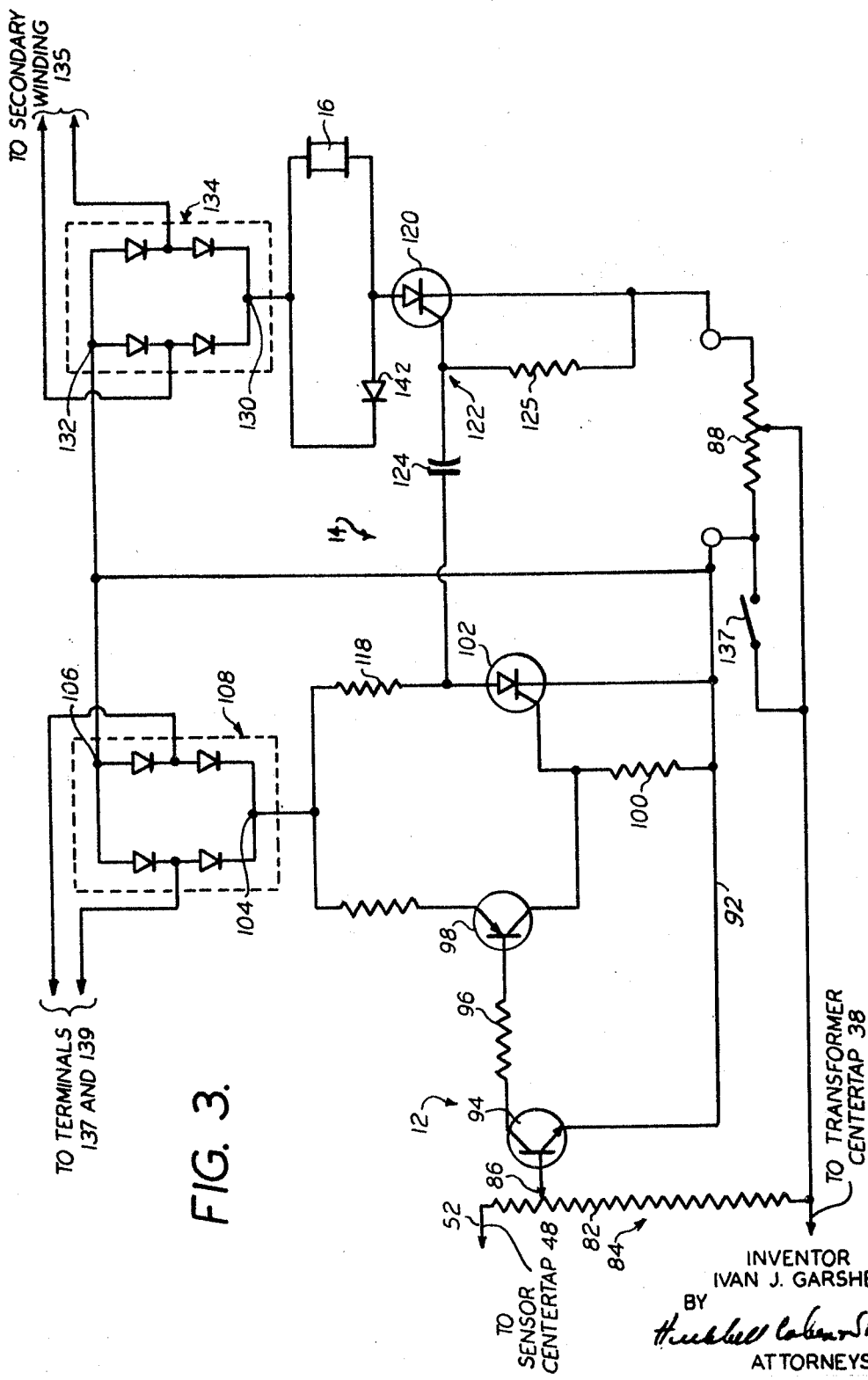

United States Patent Office 3,458,774
Patented July 29, 1969

3,458,774
MAGNETIC PROXIMITY DETECTOR
Ivan J. Garshelis, Clark, N.J., assignor to Research Associates, Inc., Linden, N.J., a corporation of New York
Continuation-in-part of application Ser. No. 361,342, Apr. 21, 1964. This application Jan. 3, 1967, Ser. No. 606,901
Int. Cl. H01h 47/32
U.S. Cl. 317—148.5                13 Claims

ABSTRACT OF THE DISCLOSURE

A closed relatively non-saturable, highly permeable magnetic circuit is magnetized by two substantially identical coils wound thereon. A relatively highly saturable, highly permeable magnetic material is interposed in the magnetic circuit between the two coils. The coils are energized in series from a centertapped AC source so as to produce boosting fluxes. The output terminals are the centertap of the AC source and a junction between the coils.

Cross references to related applications

The present invention is related to and is continuation-in-part of my earlier application, now abandoned, Ser. No. 361,342 filed by me on Apr. 21, 1964 for Control Apparatus, which application is assigned to the assignee hereof.

BACKGROUND OF THE INVENTION

Field of the invention

The present invention relates to a device for detecting magnetic fields especially of very low magnitude.

Summary

The present invention is directed to a magnetic field detector having a closed highly permeable relatively non-saturable magnetic circuit which has interposed therein a section of relatively saturable material. A pair of substantially identical coils are wound on the relatively non-saturable portion of the magnetic circuit and are connected to each other and to a centertapped AC source in such a way as to generate flux that is additive within the magnetic circuit. The flux in the magnetic circuit is sufficient to cause a substantial degree of saturation in the saturable portion thereof. Output terminals are connected to the centertap of the AC source and to the electrical junction between the two coils.

In absence of an external magnetic field there will be no output signal. However, an external magnetic field will retard or prevent saturation of first one portion of the saturable part of the magnetic circuit and then the other portion thereof to thereby cause the impedances of the coils to be different from one another to cause an imbalance and hence produce an output signal from the detector.

The output signal of the detector is preferably amplified. The amplified output is applied to the gate of a first silicon controlled rectifier to cause that SCR to at times conduct, depending upon the magnitude of the gate voltage. The anode-cathode voltage of the first SCR is differentiated by a differentiating means and the differentiated voltage is applied to the gate of a second silicon controlled rectifier which has a relay connected in series with its anode and cathode. Irrespective of what portion of a cycle the first SCR is conductive, the second SCR will conduct for the same amount of on-time for each cycle, whereby to make it a suitable source of current for the relay.

Brief description of the drawings

FIG. 2A includes diagrams of output voltage from detector in presence of external magnetic signals of different magnitudes and polarity;

FIG. 2B is a diagram of the anode voltage of a first silicon controlled rectifier in the operating circuit in the absence of an output signal from the detector;

FIG. 2C includes diagrams of anode-cathode voltage of said first silicon cotnrolled rectifier in the presence of output signals from the detector;

FIG. 2D includes diagrams of the anode-cathode voltage of a second silicon controlled rectifier in the operating circuit in the absence of an output signal from the detector;

FIG. 2E is a diagram of the anode-cathode current of the second silicon controlled rectifier in the presence of an output signal from the detector; and FIG. 3 is a schematic diagram of a modified form of amplifier-operating circuit for use in connection with the present invention.

Description of the preferred embodiments

Figure 1:
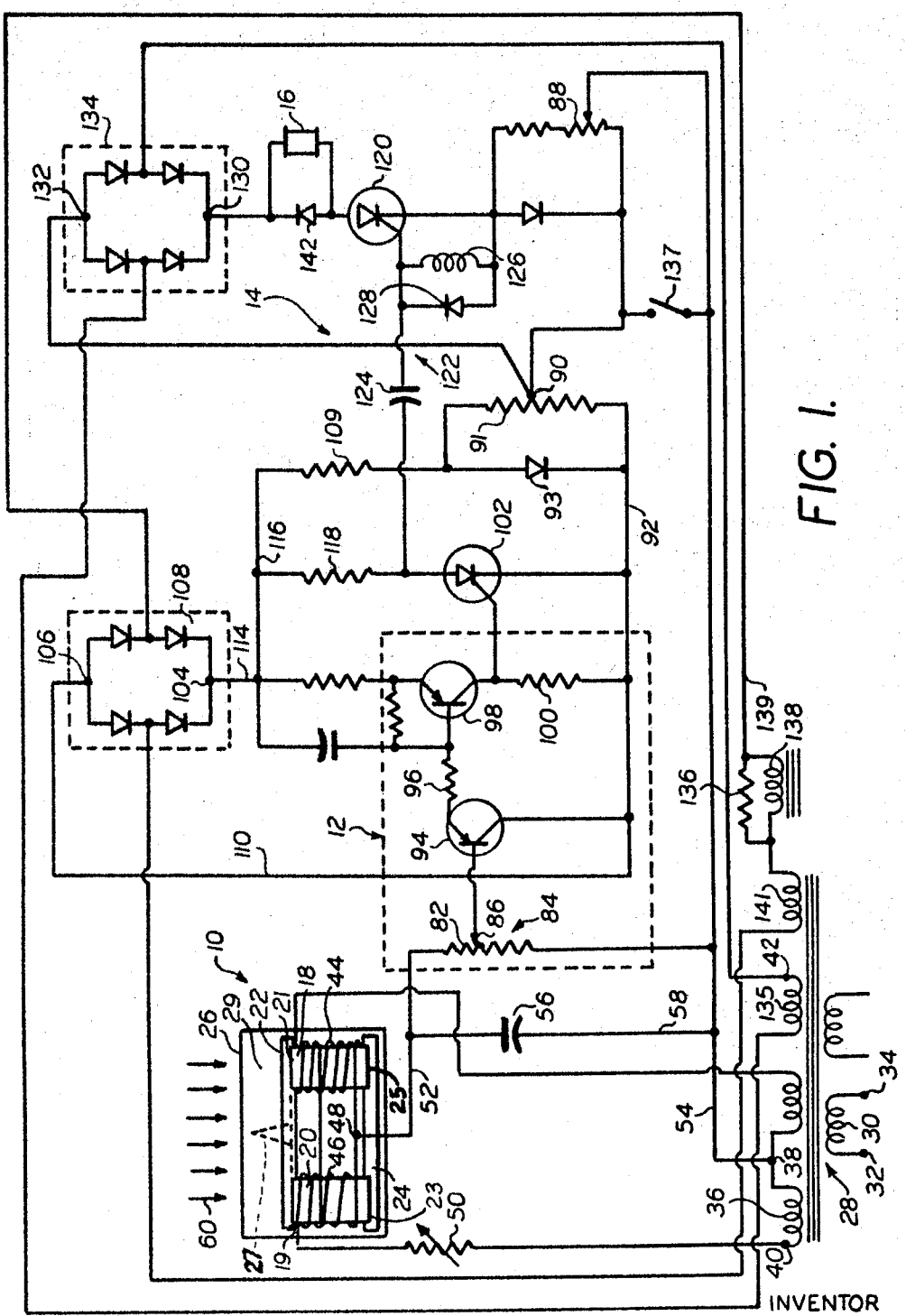
FIGURE 1 is a schematic diagram of a magnetic field detecting means embodying the present invention including a detector, a transistor amplifier and operating circuitry.

Referring now to FIG. 1 in detail, the magnetic field proximity system of the invention may be seen to comprise a magnetic field detector means indicated generally at 10, an amplifier circuit indicated generally at 12 and electrically connected to the magnetic field detector means 10 to receive and amplify output signals from the latter, an operating circuit indicated generally at 14 which is electrically connected to the amplifier circuit 12 and is operable to receive the amplified signals from the latter and selectively cause said signals to operate a control device such as, for example, relay 16.

Referring now in greater detail to the magnetic field detector 10, the same comprises a pair of spaced apart, generally parallel coil forms 18 and 20, corresponding ends of which are connected or bridged as shown by a relatively thin strap 22. A strap 24 bridges or connects the other corresponding ends of the coil forms 18 and 20 to thus provide a closed magnetic circuit as may be traced through strap 22, coil form 20, strap 24, and coil form 18, respectively. Each of the coil forms 18 and 20, and the strap 24 are preferably made of relatively non-saturable, highly permeable magnetic material in the nature of ingot iron or silicon steel, while strap 22 is preferably made of a relatively saturable magnetic material having high permeability below saturation. Most preferably bridging strap 22 is in the nature for example of "Permalloy," having square hysterisis loop characteristics for purposes made clear hereinbelow. As used herein, the term "relatively non-saturable" is intended to mean a material which will exhibit any substantial degree of non-linearity in its magnetization curve at higher values of magnetizing force than will a material that is "relatively saturable." Thus, in the closed magnetic circuit of detector 10, bridging strap 22 will become saturated while the remainder of the magnetic circuit remains unsaturated. It is also obvious to those skilled in the art that when a highly permeable relatively saturable magnetic material is mentioned, such material is highly permeable only below saturation, the permeability becoming radically reduced upon saturation of such material being achieved. Preferably, bridging strap 22 has a pair of recesses 19 and 21 in its bottom surface to receive the ends of coil forms 16 and 18, and bridging strap 24 has a pair of like recesses 23 and 25 in its upper surface to likewise receive the bottom ends of the two coil forms. By so connecting the magnetic structure, there is little stray flux at the junctures between the coil forms and the bridging straps. Spacer means 29 of any suitable non-magnetic material, for example an epoxy or silicone rubber, are disposed as shown over the strap 22 to thus provide a spaced sensing face 26 for the magnetic field detector 10 to thereby prevent an external object from substantial imbalanced coupling with the two coils which would result from such object being substantially closer to one coil than to the other. Preferably, although not necessarily, a non-saturable highly magnetically permeable tip 27 is connected to the midpoint of strap 22 and extends outward close to the face 26.

An input transformer is indicated generally at 28 and comprises a primary winding 30 having input terminals 32 and 34 for the application thereto of an AC input signal, and a secondary winding 36 which is centertapped as indicated by terminal 38 and includes output terminals 40 and 42.

Two substantially identical coils 44 and 46 are wound as shown around the respective coil forms 18 and 20, and one end of each of the coils is connected to a corresponding end of the other coil at a common terminal 48. The free end of coil 46 is connected, through a variable resistor 50, to terminal 40 of the transformer secondary winding 36, while the free end of coil 44 is connected to the other terminal 42 of the transformer secondary winding 36.

A conductor 52 extends as shown from common coil terminal 48 to provide one output line from the magnetic field detector 10, and a conductor 54 extends as shown from the centertap terminal 38 of the transformer secondary winding 36 to provide the other output line for the magnetic field detector 10. Line 58, with capacitor 56 interposed therein, provides a capacitive bridging circuit to filter out undesirable frequencies from the output of the magnetic field detector. As will be stated in further detail hereinafter, the output frequency of the detector 10 is the second harmonic of the input frequency to the detector, and capacitor 56 is proportioned to filter out all frequencies other than the second harmonic.

With the magnetic field detector 10 constructed and connected across the secondary winding 36 of the transformer 28 as described hereinabove, the energization of the primary winding 30 of transformer 28 from a convenient source of AC power will result in the flow of current from output terminal 40 of transformer secondary winding 36, through variable resistor 50, through coil 46 to common coil terminal 48, from the latter through coil 44 to terminal 42 of the transformer secondary windings 36. The coils 16 and 18 are wound and connected so that the flux generated in the respective coil forms 18 and 20 by this current flow through the coils will generate magnetic flux in the rectangular magnetic circuit which travels through said circuit in the same direction; that is, the fluxes are additive. The flux is, moreover, of sufficient magnitude to cause saturation of the saturable strap 22, first in one direction and then in the opposite direction.

Since, with no external field, the flux traveling through substantially identical coil forms 18 and 20 is the same, the respective impedances of coils 44 and 46 are substantially identical. Thus, in the absence of an external magnetic field, the voltages at the centertaps 48 and 38 will be equal so that there will be no voltage appearing across output lines 52 and 54 of the magnetic field detector 10. This is so because the electrical circuit of the magnetic field detector 10 is in essence a rectangular bridge in which the coils 44 and 46 comprise one pair of arms, and the left and right halves of transformer secondary windings 36 comprise the other pair of arms. Thus, with the impedance of coil 44 being substantially equal to the impedance of coil 46, as described hereinabove, and the impedance of the right half of transformer secondary windings 36 being substantially equal to the impedance of the left half of transformer secondary windings 36, the said bridge would be substantially balanced, whereby the input signals impressed across one pair of opposite bridge vertices, namely transformer secondary windings 36, would be nulled across the other pair of opposite bridge vertices, namely the respective output lines 52 and 54. Any minor variations in resistance between coils 44 and 46 may of course be readily compensated for by suitable adjustment of the variable resistor means 50.

When an external magnetic field, as indicated by the flux arrows 60 in FIG. 1, is encountered, the field will enter primarily through tip 27 and into the strap 22 where it will tend to divide, with a portion of the field passing to the right through the right half of strap 22 and through coil form 18 as seen in FIG. 1, and a portion of the field passing to the left through the left half of strap 22 and through the coil form 20 as seen in FIG. 1. Thus, at any given time in the alternating current cycle of the voltage applied to the coils 44 and 46 from the transformer secondary windings 36 as described hereinabove, the flux generated by the coils 44 and 46 and present in one-half of the strap 22 will be bucked by the flux from the external field while the flux generated by the coils 44 and 46 and present in the other half of strap 22 will be boosted. The external field flux which is boosting the saturating flux from the coils will cause half of strap 22 to saturate earlier in the cycle. However, the external field flux which bucks the saturating flux from the coils will cause its half of strap 22 to either not achieve saturation or, if the external field is quite small, at least to retard the time in cycle when said half of strap 22 becomes saturated. In either event, that is if either the bucking external field flux retards saturation or prevents it, the impedance of the two coils 44 and 46 will be differernt. This change in impedance will throw the bridge out of balance and thus cause a voltage to appear across terminals 38 and 48. Thus a signal is generated in response to the presence of an external field.

It will be obvious that there will be a reversal of which half of strap 22 is saturated and which is not during each half cycle of the AC input from transformer 28. However, irrespective of which half of strap 22 is saturated and which is not, the imbalance exists. Thus, in effect, the output signal is an alternating signal. However, the frequency of the output signal will be twice the frequency of the input signal. Thus, if transformer 28 is energized with 60 cycle AC, the detector output signal will be 120 cycle AC.

As previously mentioned, to filter out any undesirable frequencies from the output detector 10, a capacitor 56 is connected across output lines 52 and 54.

In order to detect very small external fields, the output voltage of the detector 10 will be quite small, and therefore require amplification prior to utilizing it to operate an output device such as the relay 16. Accordingly, the output leads 52 and 54 of detector 10 are connected to the input of the amplifier 12, preferably through an adjustable means such as voltage divider 82 comprising a resistor 84 connected across the leads 52 and 54 and an adjustable slide 86 making up an output thereof. The adjustability of voltage divider 82 yields a simple sensitivity control for the entire combination. The output of the voltage divider 82 comprises the lead 54 and the slide 86, the lead 54 being connected to a common or ground conductor 92 through a variable resistor 88 (to be described in greater detail hereinafter) and the lower portion of the tapped resistor 90. The input is applied to a first transistor 94 which amplifies the signal received from the voltage divider 82 and applies the output thereof through a coupling resistor 96 to a second transistor 98. The output from the second transistor 98 in amplifier 12 is applied across the resistor 100 which is connected between the collector of transistor 98 and the common lead 92. Thus the voltage across the resistor 100 (which is proportional to the detector output voltage) can be described diagrammatically as shown in FIG. 2A, the solid line diagram therein representing a voltage resulting from a moderate magnitude external field, the dot-dash line diagram representing a voltage resulting from a strong external field, the dashed line diagram representing a voltage resulting from a weak external field, and the dotted line diagram representing the voltage resulting from a moderate external field of reverse polarity.

Due to the relatively small input signals to the amplifier 12, if the transistor 94 has a relatively high threshold voltage, as is encountered with silicon transistors, biasing potential is required. Such bias is provided from a full wave rectifier 108 which is energized by a secondary winding 141 of transformer 28, one terminal of the winding 141 being connected to an input terminal of rectifier 108 by a resistor 136 and a choke 138 in parallel, and a conductor 139, while the other terminal of winding 141 is connected by conductor 143 directly to the other input terminal of rectifier 108.

The output terminal 106 of rectifier 108 is connected to common lead 92 by conductor 110. The bias for transistor 94 is provided by a circuit connected across the output terminals 104 and 106 of rectifier 108 which circuit may be traced from the terminal 104, through conductor 114, conductor 116, resistor 109 and resistor 91 to the terminal 106 of rectifier 108. The resistors 109 and 91 form a voltage divider and that portion of resistor 91 below the tap 90 provides the voltage that is actually applied to the transistor 94 to bias it. As will be mentioned in greater detail hereinafter the biasing voltage to the transistor 94 provided by the lower portion of the resistor 91 is further modified by an IR voltage that is fed back from the differential adjust resistor 88. The function of rectifier 93 is as a voltage regulator and temperature compensator to maintain the biasing voltage constant.

The voltage appearing across the resistor 100 is applied to the gate or control element of a silicon controlled rectifier 102. The anode and cathode of the silicon controlled rectifier 102 are connected to the output terminals 104 and 106 of the full wave rectifier 108 through conductors 114 and 116 and a resistor 118. The anode-cathode voltage applied to the silicon controlled rectifier 102 in the absence of conduction (i.e. external field) is diagrammatically illustrated in sketch B of FIG. 2, which sketch illustrates a full wave rectified signal.

As is well known to those skilled in the art of silicon controlled rectifiers, below actual breakdown voltage, an SCR will not fire or conduct irrespective of anode-cathode voltage unless the gate or control voltage reaches a predetermined value. Once the SCR becomes conductive, it will continue to conduct until the anode-cathode current drops below a predetermined value, at which point the SCR will become non-conducting or extinguished. Thus, depending upon the amplified input to the gate of SCR 102, the SCR will fire or conduct for more or less of a full cycle of the anode-cathode signal applied thereto by rectifier 108.

Assuming that the gate voltage on SCR 102 needed to cause conduction is voltage $V_i$ in FIG. 2A, then, assuming the detected field is moderate so as to yield a moderate voltage across resistor 100, as shown in solid line in FIG. 2A, the anode-cathode voltage of SCR 102 will have a characteristic curve substantially as diagrammatically illustrated in solid line in FIG. 2C. That is to say during a short period of time while the amplified input signal is rising during each half cycle, there will be no conduction through the SCR and the anode voltage will follow FIG. 2B. However, as soon as the amplified error signal reaches the value $V_i$, which will occur soon after the beginning of the cycle, the SCR 102 will conduct whereupon its anode voltage will drop to a very small value and stay there until the output voltage from full wave rectifier 108 drops so low as to reduce the anode current of SCR 102 to a value below cut-off, at which point SCR 102 will stop conducting. At cut-off, the full value of the output voltage of rectifier 108 will once again appear across the anode-cathode of SCR 102 to cause a sharp voltage rise or pip near the end of each cycle.

In contrast to this, assuming that the amplified input signal applied to the gate of SCR 102 is relatively small, as shown in a dashed line in FIG. 2A, there will be a significantly greater time lag before SCR 102 fires as it will be much farther along in the rise of the gate voltage before the voltage $V_i$ is reached. Thus, when the gate voltage on the SCR 102 follows the dashed line curve of FIG. 2A, the anode-cathode voltage of SCR 102 will follow the dashed line curve of FIG. 2C in which there is a relatively long period during which there is no conduction, and then, when the gate voltage reaches the value $V_i$, the SCR will conduct and cause current to flow which will result in a sharp drop in anode-cathode voltage which will persist until anode current drops to the cut-off value at which point the anode-cathode voltage will rise to the value of the output voltage of rectifier 108 and thereafter will be the same as the rectifier output voltage. Similarly, if the external magnetic field is of great magnitude so as to cause the gate voltage on SCR 102 to follow the dot dash line of FIG. 2A, the anode-cathode voltage of SCR 102 will follow the dot-dash curve in FIG. 2C wherein the anode-cathode voltage will follow the output voltage of rectifier 108 for a very brief time interval at which point the ignition voltage $V_i$ of SCR 102 will be reached to cause SCR 102 to conduct. Thus there will be conduction for a very long time interval during the cycle, conduction discontinuing only when the anode current reaches its cut-off value near the end of the cycle, at which point the anode voltage will rise to the value of the output voltage of rectifier 108 and will thereafter follow the curve.

An additional problem is encountered when the polarity of the external magnetic field is reversed. When this occurs, the output voltage of the sensor and the gate voltage of SCR 102 are shifted 180° so that the gate voltage, as can be seen in FIG. 2A in dotted lines, goes through a negative half cycle initially and does not move into the positive half cycle until more than half a cycle of anode-cathode voltage has passed. Finally, at some point during the second half of the anode-cathode voltage cycle, the gate voltage on SCR 102 will achieve a positive valve equal to $V_i$ at which point the SCR will conduct. Thus for more than a half cycle the anode-cathode voltage of SCR 102 will follow or be the same as the output voltage of rectifier 108 as shown in dotted lines in FIG. 2C. Of course, when the gate voltage reaches the value of $V_i$, SCR 102 will conduct and the anode-cathode voltage of SCR 102 will drop sharply to a very low value and remain there until the anode current becomes so low as to cause extinction thereof, at which point the anode-cathode voltage will again sharply rise and thereafter follow the curve of the output voltage of rectifier 108.

From the foregoing it will be seen that if the relay 16 were connected to the output of SCR 102, then the amount of time during which current would actually flow through the winding of relay 16 would vary widely in accordance with the intensity and polarity of the external magnetic field 60 being detected by the detector 10. Such a wide variation in the on-time of current flow through the relay winding is very deleterious to the operation of relay 16 and would render the device quite unreliable.

Accordingly, means are included in the operating circuit 14 for reacting to conduction through SCR 102 so as to assure that when such conduction is present, relay 16 will be energized for substantially the same amount of time during each half cycle, irrespective of the intensity or polarity of the external magnetic field 60, and that the amount of on-time is a substantial percentage of a half cycle.

This is accomplished by taking advantage of the fact that irrespective of the on-time of conduction of SCR 102, the SCR 102 always stops conducting at precisely the same point in its cycle of operation and always stops with a radical rise in anode-cathode voltage as may best be seen in FIG. 2C. As already noted this radical rise in anode-cathode voltage is due to the fact that the anode-cathode voltage of SCR 102 is equal to the output voltage of the full wave rectifier 108 less the voltage drop across the resistor 118. During the time that there is conduction through SCR 102, there will be a significant voltage appearing across the resistor 118 whereby the anode-cathode voltage of SCR 102 will not be very great. However, upon the discontinuance of current flow through SCR 102, there will be no voltage drop across resistor 118 and the full output voltage of the full wave rectifier 108 will appear across the anode and cathode of SCR 102.

To take advantage of this, the anode-cathode voltage of SCR 102 is applied to a differentiation means 122 here shown to include a capacitor 124, an inductor 126, and a rectifier 128, although other differentiation means, such as a pulse transformer, may be employed. The function of the differentiation means 122 is to apply a signal to the gate of a second silicon controlled rectifier 120 which signal is proportional to the rate of change of the anode-cathode voltage of SCR 102. The differentiation means 122 and the SCR 120 are arranged so that the output from the differentiation means 122 will be sufficiently high to cause SCR 120 to conduct only when the rate of change of anode-cathode voltage across SCR 102 is as high as can be encountered only at the time of discontinuance of current flow near the end of each cycle of operation of SCR 102.

The anode and cathode of the SCR 120 are energized from the output terminals 130 and 132 of a full wave rectifier 134 which full wave rectifier is energized by one of the secondary windings 135 of the transformer 28. By interposition of the resistor and choke 136 and 138 in the energizing circuit for the full wave rectifier 106, the output voltage of rectifier 106 lags the output voltage of rectifier 134 whereby to give rectifier 134 the appropriate phase relation with respect to the sharp voltage increase encountered at the extinguishment of conduction of SCR 102 to yield substantially a full cycle of conduction of SCR 120 as illustrated in FIG. 2E. Accordingly, relay 16 which is connected in series with the anode-cathode circuit of SCR 120 is energized for substantially the full cycle to render the duration of energization of relay 16 per cycle substantially independent of the intensity of external magnetic field 60. To further smooth out the energization of relay 16, a snubbing rectifier 142 is connected across its input terminals.

It will be noted that interposed in series with the anode-cathode circuit of silicon controlled rectifier 120 is the variable resistor 88 which constitutes a differential adjust means. The purpose of the differential adjust means comprising the variable resistor 88 is to feed a portion of the output voltage of the rectifier 134 back to the input of the transistor 94. As the input of the transisor 94 is made more positive by the feedback voltage from the differential adjust means 88, a smaller and smaller external field will be sufficient to cause transistor 94 to operate, which, in turn, will maintain relay 16 picked up. Conversely, the less voltage that is fed back to transistor 94, the greater the input signal from detector 10 is required to be to operate transistor 94 and thus maintain relay 16 energized. Thus, by varying variable resistor 88, means is available for regulating the amount of diminution of external magnetic field necessary to cause relay 16 to release once it has picked up by virtue of detection of the external magnetic field by detector 10.

It may be desirbale to adjust resistor 88 so as to feed back to transistor 94 a sufficiently high voltage upon conduction of SCR 120 so that the bias feedback voltage, together with the biasing voltage from resistor 91, will maintain the transistor 94 conducting, whereby to maintain the relay 16 in its picked up or operative condition. Such a setting would in effect render the device a latched detector wherein the relay 16 will be maintained in its operated or picked up condition once detector 10 encounters a filed sufficient to operate the entire circuit. When such is the case it is necessary to include a means for releasing relay 16 which means may simply be a shorting switch 137 across the variable resistor 88. After relay 16 has been operated and latched in its operated condition as above described, when it is desired to reset the circuit for another operation, all that need be done is to momentarily close switch 137 to thereby short circuit variable resistor 88 which will result in a removal of the feedback voltage therefrom to the transistor 94. With the feedback voltage so removed the bias on the transistor will not be sufficient to maintain the transistor conducting whereby the SCR 102 will discontinue conducting and SCR 120 will discontinue conducting to thereby deenergize relay 16.

Referring now to FIG. 3, a modified form of amplifier-operating circuit 12–14 for energizing the relay 16 is illustrated. As the circuits of FIGS. 1 and 3 are similar, only the differences will be pointed out.

Amplifier circuit 12 of FIG. 3 is similar to the amplifier circuit 12 of FIG. 1. The only difference of any consequence is the omission in FIG. 3 of the transistor biasing means 91–93, which means may be deleted if transistors 94 and 98 having a low threshold voltage, such as germanium transistors, are employed in the circuit.

With reference to operating circuit 14, it should be noted that the differentiation circuit means 122 for actuating the silicon controlled rectifier 120 comprises only the capacitor 124 and the resistor 125, the indicator 126 and its companion rectifier 128 being deleted. While such an arrangement will not give as much peaking of the input voltage to the gate of the SCR 120, the circuit does function satisfactorily.

Apart from the above recited differences, the circuits are, as already noted, substantially identical and operate substantially in accordance with the description as presented above with regard to FIGS. 1 and 2 to yield a highly sensitive magnetic detector that will give a reliable output signal upon the presence of a relatively minute external magnetic field.

While I have herein shown and described the preferred form of the present invention and have suggested modifications thereof, other changes and modifications may be made therein within the scope of the appended claims without departing from the spirit and scope of this invention.

What is claimed is:
1. Means for detecting a magnetic field comprising:
 (a) a pair of spaced apart substantially identical coil forms each having first and second ends, said coil forms each being made of relatively non-saturable highly permeable magnetic material;
 (b) a first bridging member for connecting said first ends of said coil forms to one another, said bridging member being made of highly permeable magnetic material;
 (c) a second bridging member for connecting said second ends of said coil forms to one another, said second bridging member being formed of relatively saturable magnetic material having high magnetic permeability;
 (d) first and second substantially identical electrical coils wound on said first and second coil forms;
 (e) centertapped means for energizing said coils with alternating current;

(f) circuit means for connecting said centertapped means to said first and second coils and for connecting said first and second coils to each other for causing magnetic flux generated by said coils to reinforce one another;

(g) said energizing means and said coils being so constructed and of such magnitude as to generate sufficient flux to saturate said second bridging member; and (h) a pair of output terminals, one connected to said centertap of said energizing means and the other connected to said portion of said circuit means connecting said first and second coils to each other.

2. The magnetic field detecting means of claim 1, wherein said first bridging member is relatively non-saturable.

3. The magnetic field detecting means of claim 1, further comprising non-magnetic spacer means for preventing contact with said second bridging member.

4. The magnetic field detecting means of claim 2, wherein said two coil forms are substantially longitudinally extending and parallel.

5. The magnetic field detecting means of claim 4, wherein said two bridging members each has a pair of spaced apart recesses complementary to the adjacent ends of said coil forms and in which said coil form ends are disposed.

6. The magnetic field detecting means of claim 5, wherein said bridging members are longitudinally extending strap-like members disposed perpendicularly to the axes of said coil forms.

7. The magnetic field detecting means of claim 6, and spacer means comprising non-magnetic material overlying said second bridging member.

8. The magnetic field detecting means of claim 7, and a tip of relatively non-saturable, highly permeable magnetic material secured to said second bridging member and extending therefrom close to and under the surface of said spacer means.

9. The magnetic field detecting means of claim 2, and electrically responsive operating means connected to said output terminals.

10. The magnetic field detecting means of claim 2, further comprising amplifier means having input terminals connected to said output terminals, and output terminals and electrically responsive operating means connected to said amplifier output terminals.

11. The magnetic field detecting means of claim 10, wherein said electrically responsive operating means comprises a first silicon controlled rectifier, means for energizing the anode and cathode of said first silicon controlled rectifier with a pulsating direct current voltage, means connecting the gate of said first silicon controlled rectifier to said amplifier output, means for producing a voltage in accordance with the rate of change of the anode-cathode current in said first silicon controlled rectifier, a second silicon controlled rectifier, means for energizing the anode and cathode of said second silicon controlled rectifier with a pulsating direct current voltage that leads said first mentioned pulsating direct current voltage, means for connecting said voltage producing means to the gate of said second silicon controlled rectifier, an electrically responsive device having normal and operated conditions, said electrically responsive device being connected in the anode-cathode circuit of said second silicon controlled rectifier and assuming said operated condition when current flows therethrough.

12. The magnetic field detecting means of claim 11, wherein said amplifier is a transistor amplifier, and further comprising means for producing a voltage proportional to the anode-cathode current in said second silicon controlled rectifier, means for applying said voltage as a biasing voltage in the emitter-base circuit of said transistor, and means for varying said voltage.

13. An electrical circuit comprising a pair of input terminals for connection to a non-direct current source, a first silicon controlled rectifier, means for energizing the anode and cathode of said first silicon controlled rectifier with a pulsating direct current voltage, means connecting the gate of said first silicon controlled rectifier to said input terminals, means for producing a voltage in accordance with the rate of change of the anode-cathode current in said first silicon controlled rectifier, a second silicon controlled rectifier, means for energizing the anode and cathode of said second silicon controlled rectifier with a pulsating direct current voltage that leads said first mentioned pulsating direct current voltage, means for connecting said voltage producing means to the gate of said second silicon controlled rectifier, an electrically responsive device having normal and operated conditions, said electrically responsive device being connected in the anode-cathode circuit of said second silicon controlled rectifier and assuming said operated condition when current flows therethrough.

References Cited

UNITED STATES PATENTS

| | | | |
|---|---|---|---|
| 3,197,658 | 7/1965 | Byrnes et al. | 307—116 |
| 3,260,930 | 7/1966 | Kawada | 324—43 |
| 3,390,275 | 6/1968 | Baker | 307—252 XR |

LEE T. HIX, Primary Examiner

U.S. Cl. X.R.

307—116, 252, 296, 305, 309; 340—213